United States Patent
Yang et al.

(10) Patent No.: US 12,400,418 B2
(45) Date of Patent: Aug. 26, 2025

(54) IMAGE SEGMENTATION METHOD, DEVICE AND MEDIUM

(71) Applicant: BEIJING BAIDU NETCOM SCIENCE TECHNOLOGY CO., LTD., Beijing (CN)

(72) Inventors: Jingyi Yang, Beijing (CN); Tan Yu, Beijing (CN); Mingming Sun, Beijing (CN); Ping Li, Beijing (CN)

(73) Assignee: BEIJING BAIDU NETCOM SCIENCE TECHNOLOGY CO., LTD., Beijing (CN)

( * ) Notice: Subject to any disclaimer, the term of this patent is extended or adjusted under 35 U.S.C. 154(b) by 406 days.

(21) Appl. No.: 18/148,812

(22) Filed: Dec. 30, 2022

(65) Prior Publication Data

US 2023/0133218 A1 May 4, 2023

(30) Foreign Application Priority Data

Feb. 28, 2022 (CN) .......................... 202210190656.9

(51) Int. Cl.
- *G06V 10/26* (2022.01)
- *G06V 10/42* (2022.01)
- *G06V 10/77* (2022.01)
- *G06V 10/80* (2022.01)

(52) U.S. Cl.
CPC .......... *G06V 10/26* (2022.01); *G06V 10/7715* (2022.01); *G06V 10/806* (2022.01); *G06V 10/42* (2022.01); *G06V 2201/03* (2022.01)

(58) Field of Classification Search
CPC .. G06V 10/26; G06V 10/806; G06V 10/7715; G06V 10/42; G06V 2201/03
See application file for complete search history.

(56) References Cited

U.S. PATENT DOCUMENTS

| | | | | |
|---|---|---|---|---|
| 2021/0397876 | A1* | 12/2021 | Hemani | G06V 10/761 |
| 2022/0319155 | A1* | 10/2022 | Lu | G06V 10/82 |

FOREIGN PATENT DOCUMENTS

| | | |
|---|---|---|
| CN | 112258488 A | 1/2021 |
| CN | 113888744 A | 1/2022 |
| CN | 113947681 A | 1/2022 |
| CN | 114066902 A | 2/2022 |

OTHER PUBLICATIONS

Cao et al.; "Swin-Unet: Unet-like Pure Transformer for Medical Image Segmentation;" arXiv; May 12, 2021; pp. 1-14 (14 pages).
Lian et al.; "AS-MLP: An Acial Shifted MLP Architecture for Vision;" arXiv; Jul. 18, 2021; pp. 1-14 (14 pages).
Office Action issued in Chinese Application No. 202210190656.9, mailed on Jun. 22, 2023 (20 pages).

* cited by examiner

*Primary Examiner* — Matthew C Bella
*Assistant Examiner* — Jinsu Hwang
(74) *Attorney, Agent, or Firm* — Osha Bergman Watanabe & Burton LLP

(57) ABSTRACT

An image segmentation method includes: obtaining an image to be segmented containing a target object; performing at least one image feature fusion processing on associated feature points based on the image to be segmented, and extracting global feature information during each image feature fusion processing, wherein the associated feature points are at least two feature points having a location association relation; and determining, based on the global feature information extracted, a segmentation mask for the target object.

20 Claims, 2 Drawing Sheets

IMAGE SEGMENTATION METHOD, DEVICE AND MEDIUM

CROSS-REFERENCE TO RELATED APPLICATION

This application claims priority to and benefits of Chinese Patent Application No. 202210190656.9, filed Feb. 28, 2022, the entire content of which is incorporated herein by reference.

TECHNICAL FIELD

The present disclosure relates to the field of computer technologies, in particular to the field of deep learning technologies, and provides an image segmentation method, an image segmentation apparatus, an electronic device, a non-transitory computer readable storage medium having computer instructions stored therein, and a computer program product.

BACKGROUND

Medical image segmentation is a basic problem in the field of medical image processing. For example, segmentation algorithms can be used to process computed tomography (CT) images and colonoscopic polyp images. Compared with natural image segmentation, the contrast between a target organ and the surrounding organs is much less clear in the medical image segmentation, and edges of the target organ or tumor are unclear, either. Moreover, for CT images as an example, even obtained from the same patient, the morphology and texture of the organs presented in the images are different due to different thicknesses and different z-direction positions of slices, which make segmentation a challenging task.

SUMMARY

Embodiments of the present disclosure at least provide an image segmentation method, an image segmentation apparatus, an electronic device, a program product and a storage medium.

According to a first aspect of the present disclosure, an image segmentation method is provided. The method includes: obtaining an image to be segmented containing a target object; performing at least one image feature fusion processing on associated feature points based on the image to be segmented, and extracting global feature information during each image feature fusion processing, the associated feature points being at least two feature points having a location association relation; and determining, based on the global feature information extracted, a segmentation mask for the target object.

According to a second aspect of the present disclosure, an electronic device is provided. The electronic device includes: at least one processor; and a memory communicatively connected to the at least one processor; the memory stores instructions executable by the at least one processor, and when the instructions are executed by the at least one processor, the at least one processor is caused to implement the method of any of the embodiments of the present disclosure.

According to a third aspect of the present disclosure, a non-transitory computer readable storage medium having computer instructions stored therein is provided. The computer instructions are configured to cause a computer to implement the method of any of the embodiments of the present disclosure.

It should be understood that the content described in this section is not intended to identify key or important features of embodiments of the present disclosure, nor is it intended to limit the scope of the present disclosure. Additional features of the present disclosure will be easily understood based on the following description.

BRIEF DESCRIPTION OF THE DRAWINGS

The accompanying drawings are used for better understanding of the present disclosure and do not constitute a limitation to the present disclosure, in which.

DETAILED DESCRIPTION

Figure 1:
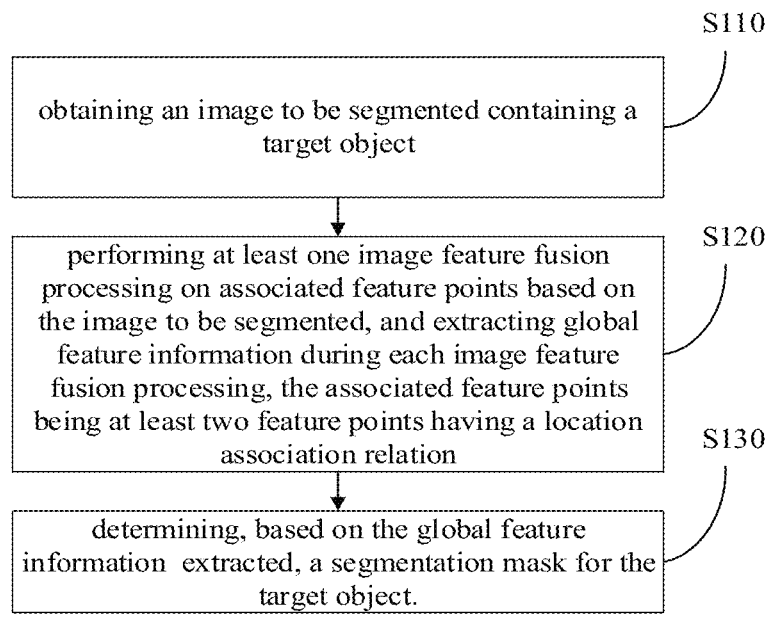
FIG. 1 is a schematic flowchart of an image segmentation method according to embodiments of the present disclosure.

The following describes embodiments of the present disclosure with reference to the accompanying drawings, which include various details of embodiments of the present disclosure to facilitate understanding of the present disclosure, and shall be considered merely illustrative. Therefore, those ordinarily skilled in the art should recognize that various changes and modifications can be made to the embodiments described herein without departing from the scope and spirit of the present disclosure. For clarity and conciseness, descriptions of well-known functions and structures are omitted in the following description.

Medical image segmentation is a basic problem in the field of medical image processing. Segmentation algorithms can be used to process and segment for example CT images and colonoscopic polyp images. The segmentation algorithms can be applied in the following scenarios: (1) automatic segmentation of lesion areas to assist doctors in diagnosis, for example, automatic detection, alarm prompts, and early treatment of diseases such as pneumothorax that require urgent treatment to avoid treatment delay; (2) reduction of manual and complex operations of doctors to facilitate the formulation of treatment plans; and (3) automatic segmentation of the organs in the image in the post-processing process of CT, ultrasound and other medical devices, and usage of targeted post-processing parameters for different organs, which can effectively improve the effect of the image after the post-processing process, and facilitate doctors to make accurate diagnosis. The image segmentation method of the present disclosure can improve the segmentation speed, reduce the manual operations and realize the automatic segmentation of the target object.

Compared with natural image segmentation, the contrast between a target organ and surrounding organs is much less clear in the medical image segmentation, and edges of the target organ or tumor are unclear, either. Moreover, for CT images as an example, even obtained from the same patient, the morphology and texture of the organs presented in the images are different due to different thicknesses and different z-direction positions of slices, which make segmentation a challenging task.

In recent years, driven by the rapid development of deep learning technologies, many algorithms based on the deep learning technologies have been proposed to continuously improve the segmentation effect. Most of these algorithms are based on convolutional neural networks, but the algorithms based on the convolutional neural networks are deficient in capturing long-distance feature relations due to the limitation of receptive field of the convolutional operation itself. The algorithm based on the attention mechanism Transformer introduces the attention mechanism, which can solve the modeling problem of long-distance and global semantic information to some extent, but the network structure is more complicated.

To solve this technical defect, the present disclosure at least provides an image segmentation method, an image segmentation apparatus, an electronic device, a storage medium, and a program product. With the embodiments according to the present disclosure, the global features of the image are extracted and fused, and the local features are also collected through the processing on the associated feature points, thereby improving the accuracy of image segmentation. Embodiments of the present disclosure are applicable to medical image segmentation, and since no attention mechanism is introduced, the network structure is relatively simple.

In the following, the image segmentation method of the present disclosure will be described with reference to specific embodiments.

FIG. 1 is a schematic flowchart of an image segmentation method according to embodiments of the present disclosure. The execution subject of the embodiments may be a device with computing capability. As shown in FIG. 1, the image segmentation method according to embodiments of the present disclosure may include the following steps.

At step S110, an image to be segmented containing a target object is obtained.

The image to be segmented may be a medical image to be segmented, for example a chest image to be segmented, in which the target object may be the lung. The image to be segmented may be a two-dimensional medical image.

At step S120, at least one image feature fusion processing on associated feature points is performed based on the image to be segmented, and global feature information is extracted during each image feature fusion processing. The associated feature points are at least two feature points having a location association relation.

For example, the associated feature points may be a plurality of adjacent feature points, and the image feature fusion processing on the adjacent feature points can focus on local features of the image. In addition, the global feature information of the image may be extracted during the image feature fusion processing. For example, a multilayer perceptron may be used for the image feature fusion processing on the associated feature points, and the obtained image feature information is the global feature information, which improves the accuracy of the extracted image features.

Before the image feature fusion processing, the image to be segmented may be mapped to a new dimension. For example, the image to be segmented may be input into a convolutional layer, and after the convolutional layer processes the image to be segmented, the image feature information of the image to be segmented in the new dimension is obtained. Based on the image feature information of the image to be segmented in the new dimension, at least one image feature fusion processing on the associated feature points is performed, and the global feature information is extracted during each image feature fusion processing. Different global feature information corresponds to global feature maps with different resolutions.

At step S130, based on the extracted global feature information, a segmentation mask for the target object is determined.

For example, final global feature information can be selected from the obtained global feature information, and the segmentation mask for the target object can be determined based on the final global feature information.

For example, a global feature map corresponding to the selected global feature information may be subjected to sampling processing based on a resolution of the image to be segmented and a resolution of the global feature map corresponding to the selected global feature information, so that a resolution of a feature map obtained by the sampling processing is the same as the resolution of the image to be segmented. Afterwards, linear mapping processing is performed on the feature map obtained by the sampling processing, to obtain the segmentation mask for the target object. At this time, a resolution of the segmentation mask is the same as that of the image to be segmented, i.e., the segmentation mask can be perfectly aligned with the image to be segmented, and a location and area of the target object in the image to be segmented can be directly determined according to the segmentation mask.

In some embodiments, the above image feature fusion processing includes first fusion processing and second fusion processing. The global feature information includes at least one first global feature map and at least one second global feature map. A first global feature map is obtained during each first fusion processing, and a second global feature map is obtained during each second fusion processing. Different first global feature maps have different resolutions, and different second global feature maps have different resolutions. In detail, the above-mentioned first global feature map and second global feature map can be generated using the following steps.

Firstly, initial image features of the image to be segmented are extracted. Afterwards, at least one first global feature map is obtained by performing at least one first fusion processing on associated feature points based on the initial image features, and by extracting the global feature information during each first fusion processing. Afterwards, at least one second global feature map is obtained by performing at least one second fusion processing on associated feature points based on a first global feature map with a lowest resolution, and by extracting the global feature information during each second fusion processing.

Figure 2:
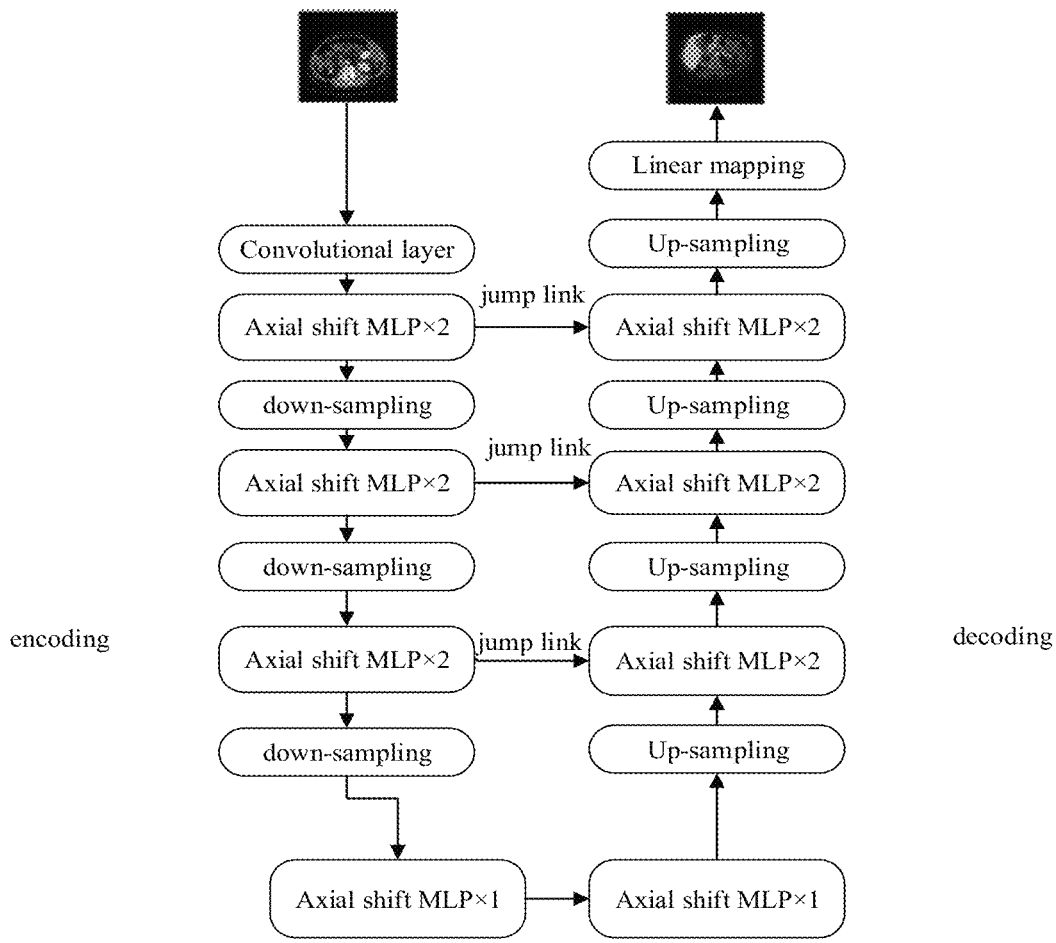
FIG. 2 is a schematic flowchart of an image segmentation method according to embodiments of the present disclosure.

As shown in FIG. 2, the above initial image features may be obtained by performing an image feature extraction on the image to be segmented by the convolutional layer. The convolutional layer can divide the image to be segmented into image blocks of a preset size during the process of image feature extraction and image mapping, and obtain image feature information corresponding to each image block in the new dimension.

Both the first fusion processing and the second fusion processing described above can be implemented by the Multilayer Perceptron (MLP).

The resolutions of the first global feature maps determined based on the above step are different, and the resolutions of the second global feature maps determined based on the above step are different, so that the extraction of image features from different scales can be realized, and both the global image features and the local image features are taken into account, which is helpful to improve the accuracy of image segmentation.

For example, the above-mentioned first global feature map may be determined according to the following steps.

For the 1$^{st}$ first fusion processing, as shown in FIG. 2, a feature map corresponding to the initial image features obtained by processing using the convolutional layer is determined as the first feature map corresponding to the lth first fusion processing. A shift operation is performed on the feature points in the first feature map to obtain the second feature map. The first global feature map is obtained by performing the first fusion processing on the associated feature points in the first feature map and the associated feature points in the second feature map, and by extracting the global feature information during the first fusion processing.

The above-described associated feature points may be feature points having the same location in the first feature map and the second feature map. The above shift operation may be a horizontal and/or vertical shift of the first feature map, and one or more second feature maps may be obtained. During the feature fusion processing on the first feature map and the second feature map by the MLP in a channel direction, the first fusion processing on the associated feature points in the first feature map and the second feature map is achieved, and the global feature information is extracted during the first fusion processing, and thus the first global feature map is obtained.

As shown in FIG. 2, the first fusion processing on the associated feature points in the first feature map and the associated feature points in the second feature map and the extraction of the global feature information during the first fusion processing may be implemented using an Axial shift MLP×2.

For an N$^{th}$ first fusion processing, as shown in FIG. 2, a first global feature map that is obtained in a previous first fusion processing is obtained, where N is a positive integer greater than 1. Down-sampling processing is performed on the first global feature map, and image features of reduced feature points are spliced into image features of adjacent feature points, and thus a first feature map corresponding to the N$^{th}$ first fusion processing is obtained. A shift operation is performed on feature points in the first feature map to obtain a second feature map. The first fusion processing is performed on associated feature points in the first feature map and associated feature points in the second feature map, and the global feature information is extracted during the first fusion processing, to obtain a first global feature map corresponding to the N$^{th}$ first fusion processing.

The steps of the N$^{th}$ first fusion processing are the same as the steps of the Pt first fusion processing, which is not repeated here. During the down-sampling processing, as the image features of the reduced feature points are spliced into the image features of the adjacent feature points, the dimensions of the image features of the remaining feature points after the down-sampling processing are increased and the number of channels is increased.

Based on the above steps, the individual first global feature maps are determined, the feature fusion of associated feature points is realized by the MLP, and the splicing of image features is performed during the down-sampling processing, so that not only the global image features and the local image features, but also the comprehensiveness of image features are taken into account while reducing the computing amount, which can improve the accuracy of the subsequent image segmentation.

As shown in FIG. 2, the first fusion processing can be performed three times to obtain three first global feature maps, and the resolutions of the first global feature maps gradually decrease, and the number of dimensions or channels of the image features corresponding to the feature points in the first global feature maps gradually increases.

After all the first global feature maps are obtained, the second global feature maps with different resolutions can be determined using the following steps.

Firstly, at least one third fusion processing on associated feature points is performed based on the first global feature map with the lowest resolution, to obtain the second global feature map with the lowest resolution, and the first global feature map with the lowest resolution has the same resolution as that of the second global feature map with the lowest resolution. At least one second fusion processing on associated feature points is performed based on the second global feature map with the lowest resolution, and the global feature information is extracted during each second fusion processing, to obtain at least one second global feature map.

Based on above approach, the second global feature maps with different resolutions can be obtained, so that the image features are extracted comprehensively from different scales, which is helpful to improve the accuracy of the subsequent image segmentation.

It is possible to determine the second global feature map with the lowest resolution only by performing one or more times the third fusion processing on the first global feature map with the lowest resolution. Alternatively, it is also possible to determine the second global feature map with the lowest resolution by the following operations: performing down-sampling processing on the first global feature map with the lowest resolution, performing at least one third fusion processing of associated feature points on a feature map obtained by the down-sampling processing, performing up-sampling processing on feature maps obtained from the at least one third fusion processing, and then performing the second fusion processing on a feature map obtained by the up-sampling processing and the second global feature map with the lowest resolution.

For example, as shown in FIG. 2, when performing the down-sampling processing, the first global feature map with the lowest resolution may be subjected to the down-sampling processing, and image features of reduced feature points are spliced into image features of adjacent feature points to obtain a third feature map. Compared with the first global feature map with the lowest resolution, the number of dimensions or channels of the image features of the feature points in the third feature map is increased and the resolution is decreased.

As shown in FIG. 2, two third fusion processing are performed, in which an input of a first third fusion processing is the third feature map mentioned above, and an input of a second third fusion processing is a fusion result of the first third fusion processing. For each of The two third fusion processing, a shift operation is performed on the input feature map when performing the feature fusion of associated feature points to determine the associated feature points, after which the input original feature map and the feature map obtained by the shift operation are fused using the MLP in the channel direction to obtain a fourth feature map including global features and local features.

As shown in FIG. 2, it is possible to use two Axial shift MLP×1 to respectively implement the first third fusion processing on the associated feature points in the third feature map and the second third fusion processing on the associated feature points in the fusion result obtained by the first third fusion processing, and the global feature information is extracted during each of the two third fusion processing to obtain corresponding feature maps.

As shown in FIG. 2, after the fourth feature map is obtained, the fourth feature map is subjected to up-sampling processing, and image features of feature points in the fourth feature map are assigned to new adjacent feature points to obtain a fifth feature map. Compared with the fourth feature map, the number of dimensions or channels of image features of feature points in the fifth feature map is decreased and the resolution is increased.

Based on the above steps, the second global feature map with the lowest resolution is determined, and the up-sampling processing, the down-sampling processing and the third fusion processing on the associated feature points are performed, and the image features are effectively extracted and fused to improve the accuracy of the determined second global feature map.

As shown in FIG. 2, after the fifth feature map is obtained, the second fusion processing on the associated feature points is performed based on the fifth feature map and the first global feature map with the lowest resolution, and the global feature information is extracted during the second fusion processing to obtain the second global feature map with the lowest resolution.

During the second fusion processing, the shift operation is performed on one or more input feature maps (the fifth feature map and the first global feature map with the lowest resolution) to determine the associated feature points, after which the input initial feature map and the feature map obtained after the shift operation are fused using the MLP in the channel direction to obtain the second global feature map including the global features and the local features.

As shown in FIG. 2, the above-mentioned second fusion processing on the associated feature points in the fifth feature map and the first global feature map with the lowest resolution can be implemented using the Axial shift MLP×2, and the global feature information is extracted during the second fusion processing.

After the second global feature map with the lowest resolution is obtained, the above-mentioned operations of obtaining at least one second global feature map by performing the at least one second fusion processing on associated feature points based on the second global feature map with the lowest resolution, and by extracting the global feature information during each second fusion processing may be implemented using the following steps.

For each second fusion processing, the second global feature map corresponding to the previous second fusion processing is obtained. The up-sampling processing is performed on the second global feature map, and image features of feature points in the second global feature map are assigned to new adjacent feature points to obtain a sixth feature map. Based on the sixth feature map and the first global feature map having the same resolution as that of the sixth feature map, the second fusion processing on associated feature points is performed, and the global feature information is extracted during the second fusion processing to obtain the second global feature map corresponding to the second fusion processing. The second global feature map obtained has the same resolution as that of the sixth feature map.

Compared with the second global feature map corresponding to the previous second fusion processing, the number of dimensions or channels of image features of feature points in the sixth feature map is decreased and the resolution is increased.

During the second fusion processing, the shift operation is performed on one or more input feature maps (the sixth feature map and the first global feature map with the same resolution as that of the sixth feature map) to determine the associated feature points, after which the input initial feature map and the feature map obtained after the shift operation are fused using the MLP in the channel direction to obtain the second global feature map including the global features and the local features, thereby improving the accuracy of feature extraction.

As shown in FIG. 2, the above-mentioned second fusion processing on the associated feature points in the sixth feature map and the first global feature map having the same resolution as that of the sixth feature map can be implemented using the Axial shift MLP×2, and the global feature information is extracted during the second fusion processing.

As shown in FIG. 2, three first fusion processing is performed to obtain three first global feature maps, and the resolutions of the first global feature maps gradually decrease, and the number of dimensions or channels of the image features corresponding to the feature points in the first global feature map gradually increases. The second fusion processing can be performed three times to obtain three second global feature maps, the resolutions of the second global feature maps gradually increase, and the number of dimensions or channels of the image features corresponding to the feature points in the second global feature maps gradually decreases. Alternatively, two third fusion processing can be performed to obtain 2 fourth feature maps. For each of the first fusion processing, the second fusion processing and the third fusion processing, the shift operation is performed on the input feature map to determine the associated feature points, and after that, the input initial feature map and the feature map obtained after the shift operation are fused using the MLP in the channel direction to obtain the feature map including the global features and the local features.

As shown in FIG. 2, each first global feature map corresponds to a second global feature map with the same resolution, and the second global feature map is determined by fusing the first global feature map with the same resolution and the feature map obtained after performing the up-sampling processing on the second global feature map obtained by the previous second fusion processing. The process of determining the second global feature map with the highest resolution incorporates the generated hierarchical, multi-scale first global feature maps, which to a certain extent compensates for the loss of space information due to down-sampling and improves the accuracy of image segmentation.

After obtaining the second global feature map with the highest resolution, the above-mentioned operation of determining the segmentation mask for the target object based on the extracted global feature information can be achieved using the following steps.

The second global feature map with the highest resolution is subjected to up-sampling processing, and image features of feature points in the second global feature map with the highest resolution are assigned to new adjacent feature points to obtain a third global feature map. The third global feature map has the same resolution and size as the image to be segmented, and the third global feature map is subjected to linear mapping processing to obtain the segmentation mask for the target object.

Compared with the second global feature map, the number of dimensions or channels of image features of feature points in the third global feature map is decreased and the resolution is increased. Processing the third global feature map by the linear mapping can determine the segmentation mask of the target object more accurately.

After obtaining the image to be segmented and before performing the image feature fusion processing, the image to be segmented can be pre-processed to improve the clarity of the image to be segmented, which can be achieved using the following steps.

Based on the object type of the target object, window width and window level information corresponding to the image to be segmented is determined. Based on the window width and window level information, pixel values of pixel points in the image to be segmented are adjusted to obtain a target segmentation image. At least one image feature fusion processing on associated feature points is performed based on the target segmentation image, and the global feature information is extracted during each image feature fusion processing.

For a chest CT image, the window width and window level information may include a window level of 200 CT and a window width of 150. After obtaining the target segmentation image, the target segmentation image may be normalized, at least one image feature fusion processing on associated feature points is performed based on the normalized image, and the global feature information is extracted during each image feature fusion processing. Before adjusting the pixel values of the pixel points in the image to be segmented based on the window width and window level information, the image to be segmented may be processed to a preset size, such as a size corresponding to 224 pixels×224 pixels.

In some embodiments, the image to be segmented can be divided into a plurality of image blocks of preset size, for example, 4 pixels×4 pixels. Each image block is mapped to a new dimension to obtain image feature information corresponding to the image block in the new dimension. The image to be segmented can be divided into the plurality of image blocks of the preset size by the convolutional layer, and each image block is mapped to a new dimension. The steps S120 and S130 can be performed for each image block. Specifically, at least one image feature fusion processing on associated feature points is performed based on the image feature information corresponding to a certain image block in the new dimension (corresponding to the initial image feature described above), and global feature information is extracted during each image feature fusion processing. Here, the global feature information is the global feature information corresponding to the image block. Afterwards, the segmentation mask of the image block for the target object is determined based on the global feature information corresponding to the image block. The specific processing steps of the image block at the steps S120 and S130 are the same as those of the whole image to be segmented, and the same contents are not repeated again. The different image blocks mentioned above do not intersect each other.

Figure 3:
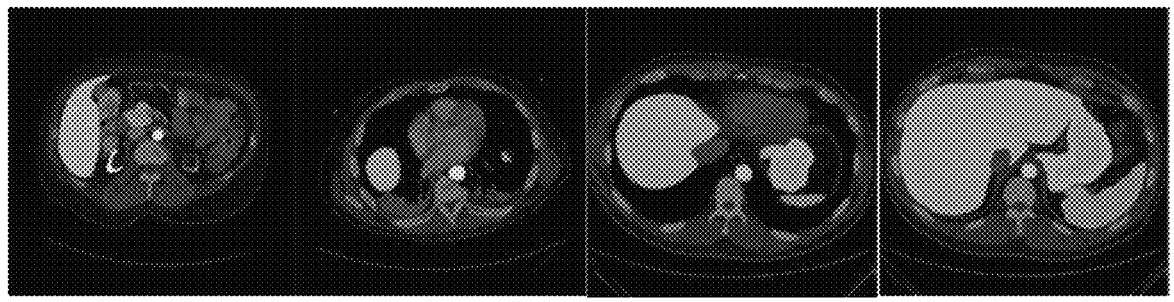
FIG. 3 is a schematic diagram of an image segmentation result according to embodiments of the present disclosure.

The method as described in the above embodiments of the present disclosure is validated on a CT image set containing 3779 clinical CT image data of 30 different patients. The image data of 18 patients are randomly selected as a training data set, and the image data of the remaining 12 patients are used as the test data. The segmentation results of the randomly selected samples are shown in FIG. 3.

Compared with the segmentation results of the leading methods (i.e., methods of the state of art and a Swin-Unet-based method) in this field in the related art, the method of the present disclosure is more refined in segmentation details, and especially at the edges is more similar to the labeled segmentation masks of the samples. Due to the segmentation based on the MLP, the method of the present disclosure encodes global space features as compared with the convolutional neural network-based algorithm, and the local feature relations can be better captured by the method of the present disclosure due to the axial shift of the feature map, which can achieve better accuracy in the medical image segmentation.

In order to quantitatively compare the segmentation mask obtained in the present disclosure with other segmentation masks also used for the medical images, an average dice-similarity coefficient (DSC) evaluation index may be adopted, which is determined by the following formula:

$$DSC = \frac{2*|X \cap Y|}{(|X|+|Y|)}$$

where X and Y are two sets, the set X includes pixel points in a medical image that belong to a label true value, the set Y includes pixel points in the medical image that are predicted to belong to a corresponding object, |X| means a number of elements in the set X, |Y| means a number of elements in the set Y, and ∩ represents an intersection of the two sets, i.e., includes the elements contained in both sets.

The obtained results are shown in Table 1.

TABLE 1

| DSC | lung | Aorta | Gallbladder | Kidney(L) | Kidney(R) | Liver | Pancreas | Spleen | Stomach |
|---|---|---|---|---|---|---|---|---|---|
| Method of present disclosure | 79.96 | 87.29 | 69.13 | 85.52 | 81.70 | 94.05 | 56.93 | 87.97 | 77.11 |
| Swin-Unet | 78.41 | 85.37 | 66.56 | 82.28 | 78.97 | 93.89 | 57.02 | 88.98 | 74.18 |
| V-Net | 68.81 | 75.34 | 51.87 | 77.1 | 80.75 | 87.84 | 40.05 | 80.56 | 56.98 |
| R50 U-net | 74.68 | 87.74 | 63.66 | 80.6 | 78.19 | 93.74 | 56.9 | 85.87 | 74.16 |
| U-Net | 76.85 | 89.07 | 69.72 | 77.77 | 68.6 | 93.43 | 53.98 | 86.67 | 75.58 |
| R50 Att-UNet | 75.57 | 55.92 | 63.91 | 79.2 | 72.71 | 93.56 | 49.37 | 87.19 | 74.95 |
| Att-UNet | 77.77 | 89.55 | 68.88 | 77.98 | 71.11 | 93.57 | 58.04 | 87.3 | 75.75 |
| R50-ViT | 71.29 | 73.73 | 55.13 | 75.8 | 72.2 | 91.51 | 45.99 | 81.99 | 73.95 |
| TransUnet | 77.48 | 87.23 | 63.13 | 81.87 | 77.02 | 94.08 | 55.86 | 85.08 | 75.62 |

As can be seen in Table 1, the DSC average indexes of 8 organs obtained by the method of the present disclosure are higher than that obtained by the rest of the methods, including the convolutional neural network-based method and the Swin-unet method.

The method as described in above embodiments of the present disclosure not only encodes the global space features, but also captures the local feature relations due to the axial shift of the feature map, and has achieved better segmentation results than that obtained by the convolutional neural network-based algorithm and the attention Transformer mechanism-based algorithm. Compared with the attention Transformer mechanism-based algorithm, the method according to the present disclosure does no need to calculate the attention relations among the image blocks, and the network design is simpler.

Based on the same inventive idea, an image segmentation apparatus corresponding to the image segmentation method is also provided in embodiments of the present disclosure. Since the principle of the apparatus in embodiments of the present disclosure to solve problems is similar to that of the image segmentation method described in above embodiments of the present disclosure, the embodiments of the apparatus can refer to the embodiments of the method, which will not be repeated again.

Figure 4:
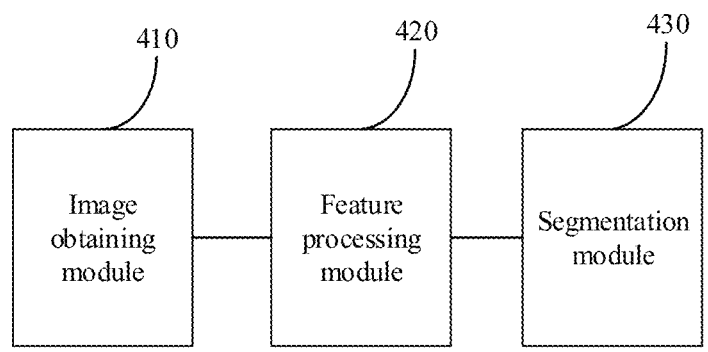
FIG. 4 is a schematic block diagram of an image segmentation apparatus according to embodiments of the present disclosure.

FIG. 4 is a schematic block of an image segmentation apparatus according to embodiments of the present disclosure. As shown in FIG. 4, the apparatus includes: an image obtaining module 410, a feature processing module 420 and a segmentation module 430.

The image obtaining module 410 is configured to obtain an image to be segmented containing a target object.

The feature processing module 420 is configured to perform at least one image feature fusion processing on associated feature points based on the image to be segmented, and extract global feature information during each image feature fusion processing. The associated feature points are at least two feature points having a location association relation.

The segmentation module 430 is configured to determine, based on the global feature information extracted, a segmentation mask for the target object.

In some embodiments, the image feature fusion processing includes first fusion processing and second fusion processing, and the global feature information includes at least one first global feature map and at least one second global feature map.

The feature processing module 420 is configured to:

extract initial image features of the image to be segmented;

obtain at least one first global feature map by performing at least one first fusion processing on associated feature points based on the initial image features, and by extracting global feature information during each first fusion processing, different first global feature maps having different resolutions; and obtain at least one second global feature map by performing at least one second fusion processing on associated feature points based on a first global feature map with a lowest resolution, and by extracting global feature information during each second fusion processing, different second global feature maps having different resolutions.

In some embodiments, the segmentation module 430 is configured to:

obtain a third global feature map by performing up-sampling processing on a second global feature map with a highest resolution and assigning image features of feature points in the second global feature map with the highest resolution to new adjacent feature points, the third global feature map having the same resolution as that of the image to be segmented; and obtain the segmentation mask for the target object by performing linear mapping processing on the third global feature map.

In some embodiments, the feature processing module 420 is configured to:

obtain, for each first fusion processing, a first feature map corresponding to the first fusion processing, a feature map corresponding to the initial image features being a first feature map corresponding to Pt first fusion processing;

obtain a second feature map by performing a shift operation on feature points in the first feature map; and obtain a first global feature map by performing the first fusion processing on associated feature points in the first feature map and associated feature points in the second feature map, and by extracting the global feature information during the first fusion processing.

In some embodiments, the feature processing module 420 is configured to:

for $N^{th}$ first fusion processing, obtain a first global feature map obtained in previous first fusion processing, N being a positive integer greater than 1; and obtain a first feature map corresponding to the $N^{th}$ first fusion processing by performing down-sampling processing on the first global feature map obtained, and by splicing image features of reduced feature points into image features of adjacent feature points.

In some embodiments, the feature processing module 420 is configured to:

obtain a second global feature map with a lowest resolution by performing at least one third fusion processing on associated feature points based on the first global feature map with the lowest resolution, the first global feature map with the lowest resolution having the same resolution as that of the second global feature map with the lowest resolution; and obtain the at least one second global feature map by performing at least one second fusion processing on associated feature points based on the second global feature map with the lowest resolution, and by extracting the global feature information during each second fusion processing.

In some embodiments, the feature processing module 420 is configured to:

obtain a third feature map by performing down-sampling processing on the first global feature map with the lowest resolution and by splicing image features of reduced feature points into image features of adjacent feature points;

obtain a fourth feature map by performing at least one third fusion processing on associated feature points based on the third feature map;

obtain a fifth feature map by performing up-sampling processing on the fourth feature map and by assigning image features of feature points in the fourth feature map to new adjacent feature points; and obtain the second global feature map with the lowest resolution by performing second fusion processing on associated feature points based on the fifth feature map and the first global feature map with the lowest resolution, and by extracting global feature information during the second fusion processing.

In some embodiments, the feature processing module 420 is configured to:

obtain, for each second fusion processing, a second global feature map corresponding to previous second fusion processing;

obtain a sixth feature map by performing up-sampling processing on the second global feature map obtained and by assigning image features of feature points in the second global feature map to new adjacent feature points; and obtain a second global feature map corresponding to the second fusion processing by performing second fusion processing on associated feature points based on the sixth feature map and a first global feature map having the same resolution as that of the sixth feature map, and by extracting the global feature information during the second fusion processing.

In some embodiments, the feature processing module 420 is configured to:

determine, based on an object type of the target object, window width and window level information corresponding to the image to be segmented;

obtain a target segmentation image by adjusting pixel values of pixel points in the image to be segmented based on the window width and window level information; and perform the at least one image feature fusion processing on associated feature points based on the target segmentation image, and extract the global feature information during each image feature fusion processing.

In some embodiments, the feature processing module 420 is configured to:

perform the at least one image feature fusion processing on associated feature points using an MLP, and extract the global feature information during each image feature fusion processing.

The acquisition, storage and application of the user's personal information involved in the technical solutions of the present disclosure are in compliance with relevant laws and regulations, and do not violate public order and morals.

According to embodiments of the present disclosure, the present disclosure also provides an electronic device, a readable storage medium and a computer program product.

Figure 5:
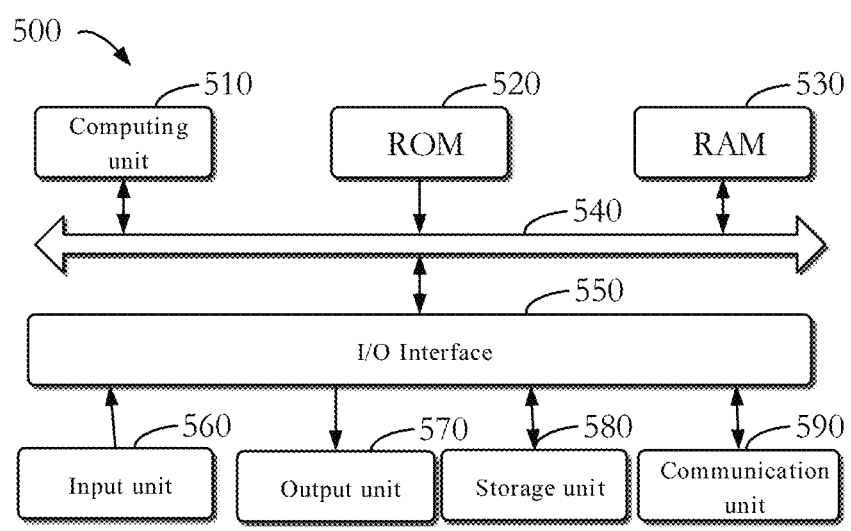
FIG. 5 is a schematic block diagram of an electronic device according to embodiments of the present disclosure.

FIG. 5 is a schematic block diagram of an example electronic device 500 for implementing embodiments of the present disclosure. Electronic devices are intended to represent various forms of digital computers, such as laptop computers, desktop computers, workbenches, personal digital assistants, servers, blade servers, mainframe computers, and other suitable computers. Electronic devices may also represent various forms of mobile devices, such as personal digital processing, cellular phones, smart phones, wearable devices, and other similar computing devices. The components shown herein, their connections and relations, and their functions are merely examples, and are not intended to limit the implementations of the present disclosure described and/or required herein.

As illustrated in FIG. 5, the electronic device 500 includes a computing unit 510 for performing various appropriate actions and processes based on computer programs stored in a Read-Only Memory (ROM) 520 or computer programs loaded from a storage unit 580 to a Random Access Memory (RAM) 530. In the RAM 530, various programs and data required for the operation of the device 500 are stored. The computing unit 510, the ROM 520, and the RAM 530 are connected to each other through a bus 540. An input/output (I/O) interface 550 is also connected to the bus 540.

Components in the device 500 are connected to the I/O interface 550, including: an input unit 560, such as a keyboard, a mouse; an output unit 570, such as various types of displays, speakers; a storage unit 580, such as a disk, an optical disk; and a communication unit 590, such as network cards, modems, and wireless communication transceivers. The communication unit 590 allows the device 500 to exchange information/data with other devices through a computer network such as the Internet and/or various telecommunication networks.

The computing unit 510 may be various general-purpose and/or dedicated processing components with processing and computing capabilities. Some examples of the computing unit 510 include, but are not limited to, a Central Processing Unit (CPU), a Graphics Processing Unit (GPU), various dedicated AI computing chips, various computing units that run machine learning model algorithms, and a Digital Signal Processor (DSP), and any appropriate processor, controller and microcontroller. The computing unit 510 executes the various methods and processes described above, such as the image segmentation method. For example, in some embodiments, the image segmentation method may be implemented as a computer software program, which is tangibly contained in a machine-readable medium, such as the storage unit 580. In some embodiments, part or all of the computer program may be loaded and/or installed on the device 500 via the ROM 520 and/or the communication unit 590. When the computer program is loaded on the RAM 530 and executed by the computing unit 510, one or more steps of the image segmentation method described above may be executed. Alternatively, in other embodiments, the computing unit 510 may be configured to perform the image segmentation method in any other suitable manner (for example, by means of firmware).

Various implementations of the systems and techniques described above may be implemented by a digital electronic circuit system, an integrated circuit system, a Field Programmable Gate Array (FPGA), an Application Specific Integrated Circuit (ASIC), an Application Specific Standard Product (ASSP), a System on Chip (SOC), a Complex Programmable Logic Device (CPLD), a computer hardware, a firmware, a software and/or a combination thereof. These various embodiments may be implemented in one or more computer programs, the one or more computer programs may be executed and/or interpreted on a programmable system including at least one programmable processor, which may be a dedicated or general programmable processor for receiving data and instructions from the storage system, at least one input device and at least one output device, and transmitting the data and instructions to the storage system, the at least one input device and the at least one output device.

The program code configured to implement the method of the present disclosure may be written in any combination of one or more programming languages. These program codes may be provided to the processors or controllers of general-purpose computers, dedicated computers, or other programmable data processing devices, so that the program codes, when executed by the processors or controllers, enable the functions/operations specified in the flowchart and/or block diagram to be implemented. The program code may be executed entirely on the machine, partly executed on the machine, partly executed on the machine and partly executed on the remote machine as an independent software package, or entirely executed on the remote machine or server.

In the context of the present disclosure, a machine-readable medium may be a tangible medium that may contain or store a program for use by or in connection with an instruction execution system, apparatus, or device. The machine-readable medium may be a machine-readable signal medium or a machine-readable storage medium. The machine-readable medium may include, but is not limited to, an electronic, magnetic, optical, electromagnetic, infrared, or semiconductor system, apparatus, or device, or any suitable combination of the foregoing. More specific examples of the machine-readable storage medium include electrical connections based on one or more wires, portable computer disks, hard disks, RAMs, ROMs, electrically programmable read-only-memories (EPROMs), flash memories, fiber optics, Compact Disc Read-Only Memories (CD-ROMs), optical storage devices, magnetic storage devices, or any suitable combination of the foregoing.

In order to provide interaction with a user, the systems and techniques described herein may be implemented on a computer having a display device (e.g., a Cathode Ray Tube (CRT) or a Liquid Crystal Display (LCD) monitor) for displaying information to a user; and a keyboard and a pointing device (such as a mouse or a trackball) through which the user can provide input to the computer. Other kinds of devices may also be used to provide interaction with the user. For example, the feedback provided to the user may be any form of sensory feedback (e.g., visual feedback, auditory feedback, or haptic feedback), and the input from the user may be received in any form (including acoustic input, voice input, or tactile input).

The systems and technologies described herein can be implemented in a computing system that includes back-end components (for example, a data server), or a computing system that includes middleware components (for example, an application server), or a computing system that includes front-end components (for example, a user computer with a graphical user interface or a web browser, through which the user can interact with the implementation of the systems and technologies described herein), or a computing system that includes any combination of such back-end components, middleware components or front-end components. The components of the system may be interconnected by any form or medium of digital data communication (e.g., a communication network). Examples of the communication networks include: a Local Area Network (LAN), a Wide Area Network (WAN), and the Internet.

The computer system may include a client and a server. The client and server are generally remote from each other and interact through a communication network. The client-server relation is generated by computer programs running on the respective computers and having a client-server relation with each other. The server may be a cloud server, a server of a distributed system or a server combined with a block-chain.

It should be understood that the various forms of processes shown above can be used to reorder, add or delete steps. For example, the steps described in the present disclosure could be performed in parallel, sequentially, or in a different order, which is not limited herein, as long as the desired result of the technical solution disclosed in the present disclosure is achieved.

The above specific embodiments do not constitute a limitation on the protection scope of the present disclosure. Those skilled in the art should understand that various modifications, combinations, sub-combinations and substitutions can be made according to design requirements and other factors. Any modification, equivalent replacement, improvement and the like made within the spirit and principle of the present disclosure shall be included in the protection scope of the present disclosure.

What is claimed is:

1. An image segmentation method, comprising:
obtaining an image to be segmented containing a target object;
performing at least one image feature fusion processing on associated feature points based on the image to be segmented, and extracting global feature information during each image feature fusion processing, wherein the associated feature points are at least two feature points having a location association relation; and
determining, based on the global feature information extracted, a segmentation mask for the target object;
wherein the image feature fusion processing comprises first fusion processing and second fusion processing, and the global feature information comprises at least one first global feature map and at least one second global feature map; and
wherein performing the at least one image feature fusion processing on associated feature points based on the image to be segmented and extracting the global feature information during each image feature fusion processing, comprises:
extracting initial image features of the image to be segmented;
obtaining the at least one first global feature map by performing at least one first fusion processing on associated feature points based on the initial image features, and by extracting global feature information during each first fusion processing, wherein different first global feature maps have different resolutions; and
obtaining the at least one second global feature map by performing at least one second fusion processing on associated feature points based on a first global feature map with a lowest resolution, and by extracting global feature information during each second fusion processing, wherein different second global feature maps have different resolutions;
wherein determining, based on the global feature information extracted, the segmentation mask for the target object comprises:
obtaining a third global feature map by performing up-sampling processing on a second global feature map with a highest resolution and assigning image features of feature points in the second global feature map with the highest resolution to new adjacent feature points, wherein the third global feature map has the same resolution as that of the image to be segmented; and
obtaining the segmentation mask for the target object by performing linear mapping processing on the third global feature map.

2. The method of claim 1, wherein obtaining the at least one first global feature map by performing the at least one first fusion processing on associated feature points based on the initial image features, and by extracting the global feature information during each first fusion processing, comprises:
obtaining, for each first fusion processing, a first feature map corresponding to the first fusion processing, wherein a feature map corresponding to the initial image features is a first feature map corresponding to $1^{st}$ first fusion processing;
obtaining a second feature map by performing a shift operation on feature points in the first feature map; and
obtaining a first global feature map by performing the first fusion processing on associated feature points in the first feature map and associated feature points in the second feature map, and by extracting the global feature information during the first fusion processing.

3. The method of claim 2, wherein obtaining the first feature map corresponding to the first fusion processing, comprises:
for $N^{th}$ first fusion processing, obtaining a first global feature map obtained in previous first fusion processing, wherein N is a positive integer greater than 1; and
obtaining a first feature map corresponding to the $N^{th}$ first fusion processing by performing down-sampling processing on the first global feature map obtained, and by splicing image features of reduced feature points into image features of adjacent feature points.

4. The method of claim 1, wherein obtaining the at least one second global feature map by performing the at least one second fusion processing on associated feature points based on the first global feature map with the lowest resolution, and by extracting the global feature information during each second fusion processing, comprises:
obtaining a second global feature map with a lowest resolution by performing at least one third fusion processing on associated feature points based on the first global feature map with the lowest resolution, wherein the first global feature map with the lowest resolution has the same resolution as that of the second global feature map with the lowest resolution; and
obtaining the at least one second global feature map by performing at least one second fusion processing on associated feature points based on the second global feature map with the lowest resolution, and by extracting the global feature information during each second fusion processing.

5. The method of claim 4, wherein obtaining the second global feature map with the lowest resolution by performing the at least one third fusion processing on associated feature points based on the first global feature map with the lowest resolution, comprises:
obtaining a third feature map by performing down-sampling processing on the first global feature map with the lowest resolution and by splicing image features of reduced feature points into image features of adjacent feature points;
obtaining a fourth feature map by performing at least one third fusion processing on associated feature points based on the third feature map;
obtaining a fifth feature map by performing up-sampling processing on the fourth feature map and by assigning image features of feature points in the fourth feature map to new adjacent feature points; and
obtaining the second global feature map with the lowest resolution by performing second fusion processing on associated feature points based on the fifth feature map and the first global feature map with the lowest resolution, and by extracting global feature information during the second fusion processing.

6. The method of claim 4, wherein obtaining the at least one second global feature map by performing the at least one second fusion processing on associated feature points based on the second global feature map with the lowest resolution, and by extracting the global feature information during each second fusion processing, comprises:
obtaining, for each second fusion processing, a second global feature map corresponding to previous second fusion processing;
obtaining a sixth feature map by performing up-sampling processing on the second global feature map obtained and by assigning image features of feature points in the second global feature map to new adjacent feature points; and
obtaining a second global feature map corresponding to the second fusion processing by performing the second fusion processing on associated feature points based on the sixth feature map and a first global feature map having the same resolution as that of the sixth feature map, and by extracting the global feature information during the second fusion processing.

7. The method of claim 1, wherein performing at least one image feature fusion processing on associated feature points based on the image to be segmented, and extracting the global feature information during each image feature fusion processing, comprises:
determining, based on an object type of the target object, window width and window level information corresponding to the image to be segmented;
obtaining a target segmentation image by adjusting pixel values of pixel points in the image to be segmented based on the window width and window level information; and
performing the at least one image feature fusion processing on associated feature points based on the target segmentation image, and extracting the global feature information during each image feature fusion processing.

8. The method of claim 1, wherein performing the at least one image feature fusion processing on associated feature points, and extracting the global feature information during each image feature fusion processing, comprises:
performing the at least one image feature fusion processing on associated feature points using a multilayer perceptron, and extracting the global feature information during each image feature fusion processing.

9. The method of claim 1, wherein the image to be segmented is a medical image.

10. An electronic device, comprising:
at least one processor; and
a memory communicatively connected to the at least one processor; wherein
the memory stores instructions executable by the at least one processor, and when the instructions are executed by the at least one processor, the at least one processor is caused to implement an image segmentation method, comprising:
obtaining an image to be segmented containing a target object;
performing at least one image feature fusion processing on associated feature points based on the image to be segmented, and extracting global feature information during each image feature fusion processing, wherein the associated feature points are at least two feature points having a location association relation; and
determining, based on the global feature information extracted, a segmentation mask for the target object;
wherein the image feature fusion processing comprises first fusion processing and second fusion processing, and the global feature information comprises at least one first global feature map and at least one second global feature map; and
wherein performing the at least one image feature fusion processing on associated feature points based on the image to be segmented and extracting the global feature information during each image feature fusion processing, comprises:
extracting initial image features of the image to be segmented;
obtaining the at least one first global feature map by performing at least one first fusion processing on associated feature points based on the initial image features, and by extracting global feature information during each first fusion processing, wherein different first global feature maps have different resolutions; and
obtaining the at least one second global feature map by performing at least one second fusion processing on associated feature points based on a first global feature map with a lowest resolution, and by extracting global feature information during each second fusion processing, wherein different second global feature maps have different resolutions;

wherein determining, based on the global feature information extracted, the segmentation mask for the target object comprises:

obtaining a third global feature map by performing up-sampling processing on a second global feature map with a highest resolution and assigning image features of feature points in the second global feature map with the highest resolution to new adjacent feature points, wherein the third global feature map has the same resolution as that of the image to be segmented; and obtaining the segmentation mask for the target object by performing linear mapping processing on the third global feature map.

11. The electronic device of claim 10, wherein obtaining the at least one first global feature map by performing the at least one first fusion processing on associated feature points based on the initial image features, and by extracting the global feature information during each first fusion processing, comprises:

obtaining, for each first fusion processing, a first feature map corresponding to the first fusion processing, wherein a feature map corresponding to the initial image features is a first feature map corresponding to $1^{st}$ first fusion processing;

obtaining a second feature map by performing a shift operation on feature points in the first feature map; and obtaining a first global feature map by performing the first fusion processing on associated feature points in the first feature map and associated feature points in the second feature map, and by extracting the global feature information during the first fusion processing.

12. The electronic device of claim 11, wherein obtaining the first feature map corresponding to the first fusion processing, comprises:

for $N^{th}$ first fusion processing, obtaining a first global feature map obtained in previous first fusion processing, wherein N is a positive integer greater than 1; and obtaining a first feature map corresponding to the $N^{th}$ first fusion processing by performing down-sampling processing on the first global feature map obtained, and by splicing image features of reduced feature points into image features of adjacent feature points.

13. The electronic device of claim 10, wherein obtaining the at least one second global feature map by performing the at least one second fusion processing on associated feature points based on the first global feature map with the lowest resolution, and by extracting the global feature information during each second fusion processing, comprises:

obtaining a second global feature map with a lowest resolution by performing at least one third fusion processing on associated feature points based on the first global feature map with the lowest resolution, wherein the first global feature map with the lowest resolution has the same resolution as that of the second global feature map with the lowest resolution; and obtaining the at least one second global feature map by performing at least one second fusion processing on associated feature points based on the second global feature map with the lowest resolution, and by extracting the global feature information during each second fusion processing.

14. The electronic device of claim 13, wherein obtaining the second global feature map with the lowest resolution by performing the at least one third fusion processing on associated feature points based on the first global feature map with the lowest resolution, comprises:

obtaining a third feature map by performing down-sampling processing on the first global feature map with the lowest resolution and by splicing image features of reduced feature points into image features of adjacent feature points;

obtaining a fourth feature map by performing at least one third fusion processing on associated feature points based on the third feature map;

obtaining a fifth feature map by performing up-sampling processing on the fourth feature map and by assigning image features of feature points in the fourth feature map to new adjacent feature points; and obtaining the second global feature map with the lowest resolution by performing second fusion processing on associated feature points based on the fifth feature map and the first global feature map with the lowest resolution, and by extracting global feature information during the second fusion processing.

15. The electronic device of claim 13, wherein obtaining the at least one second global feature map by performing the at least one second fusion processing on associated feature points based on the second global feature map with the lowest resolution, and by extracting the global feature information during each second fusion processing, comprises:

obtaining, for each second fusion processing, a second global feature map corresponding to previous second fusion processing;

obtaining a sixth feature map by performing up-sampling processing on the second global feature map obtained and by assigning image features of feature points in the second global feature map to new adjacent feature points; and obtaining a second global feature map corresponding to the second fusion processing by performing the second fusion processing on associated feature points based on the sixth feature map and a first global feature map having the same resolution as that of the sixth feature map, and by extracting the global feature information during the second fusion processing.

16. A non-transitory computer readable storage medium having computer instructions stored therein, wherein the computer instructions are configured to cause a computer to implement an image segmentation method, comprising:

obtaining an image to be segmented containing a target object;

performing at least one image feature fusion processing on associated feature points based on the image to be segmented, and extracting global feature information during each image feature fusion processing, wherein the associated feature points are at least two feature points having a location association relation; and determining, based on the global feature information extracted, a segmentation mask for the target object;

wherein the image feature fusion processing comprises first fusion processing and second fusion processing, and the global feature information comprises at least one first global feature map and at least one second global feature map; and wherein performing the at least one image feature fusion processing on associated feature points based on the image to be segmented and extracting the global feature information during each image feature fusion processing, comprises:

extracting initial image features of the image to be segmented;

obtaining the at least one first global feature map by performing at least one first fusion processing on associated feature points based on the initial image features, and by extracting global feature information during each first fusion processing, wherein different first global feature maps have different resolutions; and obtaining the at least one second global feature map by performing at least one second fusion processing on associated feature points based on a first global feature map with a lowest resolution, and by extracting global feature information during each second fusion processing, wherein different second global feature maps have different resolutions;

wherein determining, based on the global feature information extracted, the segmentation mask for the target object comprises:

obtaining a third global feature map by performing up-sampling processing on a second global feature map with a highest resolution and assigning image features of feature points in the second global feature map with the highest resolution to new adjacent feature points, wherein the third global feature map has the same resolution as that of the image to be segmented; and obtaining the segmentation mask for the target object by performing linear mapping processing on the third global feature map.

17. The electronic device of claim 10, wherein performing at least one image feature fusion processing on associated feature points based on the image to be segmented, and extracting the global feature information during each image feature fusion processing, comprises:

determining, based on an object type of the target object, window width and window level information corresponding to the image to be segmented;

obtaining a target segmentation image by adjusting pixel values of pixel points in the image to be segmented based on the window width and window level information; and performing the at least one image feature fusion processing on associated feature points based on the target segmentation image, and extracting the global feature information during each image feature fusion processing.

18. The electronic device of claim 10, wherein performing the at least one image feature fusion processing on associated feature points, and extracting the global feature information during each image feature fusion processing, comprises:

performing the at least one image feature fusion processing on associated feature points using a multilayer perceptron, and extracting the global feature information during each image feature fusion processing.

19. The electronic device of claim 10, wherein the image to be segmented is a medical image.

20. The non-transitory computer readable storage medium of claim 16, wherein obtaining the at least one first global feature map by performing the at least one first fusion processing on associated feature points based on the initial image features, and by extracting the global feature information during each first fusion processing, comprises:

obtaining, for each first fusion processing, a first feature map corresponding to the first fusion processing, wherein a feature map corresponding to the initial image features is a first feature map corresponding to $1^{st}$ first fusion processing;

obtaining a second feature map by performing a shift operation on feature points in the first feature map; and obtaining a first global feature map by performing the first fusion processing on associated feature points in the first feature map and associated feature points in the second feature map, and by extracting the global feature information during the first fusion processing.

* * * * *